Patented Apr. 25, 1944

2,347,231

UNITED STATES PATENT OFFICE 2,347,231

CATALYTIC REACTIONS WITH CARBONACEOUS MATERIALS

Fritz Stoewener, Ludwigshafen-on-the-Rhine, and Friedrich Becke, Mannheim, Germany; vested in the Alien Property Custodian No Drawing. Application February 28, 1940, Serial No. 321,211. In Germany January 24, 1939

9 Claims. (Cl. 196—52)

The present invention relates to improvements in the carrying out of catalytic reactions with carbonaceous materials, more particularly in the cracking of hydrocarbons and the destructive hydrogenation of carbonaceous materials.

Porous catalysts or carrier masses have already been used in catalytic reactions with carbonaceous materials, especially with hydrocarbons as initial or final products and when working at an elevated temperature, for example at 200° C. or more, especially in the cracking, polymerization or dehydrogenation of hydrocarbons or in the destructive hydrogenation, which may be a cracking, refining or aromatizing destructive hydrogenation, of coals, tars and mineral oils. Among suitable catalysts or carrier masses we may mention natural or synthetic bleaching earths or similar products obtained from natural substances by a chemical treatment, for example with acid, and similar silicates all of which substances are known to consist for their greater part of silicic acid and in addition contain alumina, magnesia, alkali, titanium oxide and other substances. It is also known to use inorganic gels, especially silica gel containing metal oxides, for example alumina, as catalysts or carrier masses in the said reactions.

We have found that the pH-value of the final porous catalyst plays an important part in the reactions above referred to, more specifically in the cracking of hydrocarbon oils and the destructive hydrogenation of coals, tars and mineral oils and that the best efficiency of the catalyst, in particular, may be secured and reestablished as many times as desired, if the catalyst, after having been heated to a higher temperature, say to from 200 to 800° C., preferably to its intended working temperature or to temperatures between the latter and the temperature at which the catalyst is regenerated or revivified, possesses a pH-value of between 2.5 and 5, preferably between 3 and 4. This condition is in no way naturally complied with by the conventional materials used as catalysts, since bleaching earths or gels possess most different pH-values depending on the supplies from which they are derived, and on the methods of manufacturing to which they were subjected, and because with those porous materials which initially possess a proper pH-value, this value may be markedly altered upwards or downwards in the usual after-treatments with acids, alkalies, metal salts and the like, or even upon heating to higher temperatures, depending on their purity or on the kind of catalytic admixtures. Apart from the fact that too strongly acid or too strongly alkaline a reaction of the catalyst tends to sintering at the high working temperatures and those used in the reactivation of the catalyst, and hence a considerable diminution not only of the finest but also of the coarser pores with a consequent diminution of the active surface of the catalyst, it is also necessary to keep the catalyst slightly acid within the narrow limits in order to prevent it from being too strongly contaminated by the formation of resinous products and falling off in efficiency through too strong a deposition of carbon in its finest pores, its lifetime being thus prolonged.

The process according to our present invention consists in selecting from among the numerous natural or synthetic porous silicates known, exhibiting most different pH-values, as for example bleaching earths, zeolites or the like, or silica gels or other gels, as for example those of the oxides of iron, chromium, titanium, tin, molybdenum, tungsten, zirconium, manganese or mixtures of these with one another or with silicic acid, or gels of the phosphates of aluminum, iron or chromium, or gels of the composition of cryolite, acid treated bauxites or waste materials containing silicic acid, those for the said reactions the pH-value of which after heating lies within the above-defined limits, preferably between 3 and 4, or, should the said substances possess an inappropriate pH-value, establishing the desired value by a subsequent treatment and then using the substances for the purposes of the present invention. Diatomaceous earth of a proper pH-value which has been washed with acid and moulded together with alumina may also be employed.

Whereas the pH-value of sols, gels or precipitates may be reliably ascertained by means of indicators or electrodes (the sol is tested for example by means of an antimony electrode, whereas the gel is tested for example by spotting it with indicator solutions), the measurement of the pH-value of the porous catalysts, which retain H- or OH-ions as well as salts by adsorption, is more difficult. The pH-values, therefore, are determined in the following manner:

3 grams of catalyst substance (grain size from 2 to 3 millimeters) are shaken for 2 hours in a Jena glass bottle with 30 cubic centimeters of a normal solution of potassium chloride. After settling, the clear solution is tested by means of a glass electrode.

It is preferable in the process according to the present invention to use silica gel either alone or in conjunction with one or more metal compounds, preferably alumina. Among substances to be added as catalytic media to the final silica gel, silica sol or silica jelly, all of which may have alumina added to them, or to the precipitates containing silicic acid or the bleaching earths, etc., may be mentioned above all the catalytic substances already known for the purposes in question; thus, for example, for cracking use may be made of compounds of aluminum, boron, magnesium, beryllium or manganese and for destructive hydrogenation use may be made of sulphides or oxides of heavy metals, especially those of the metals of the sixth to the eighth group of the periodic system, for example of molybdenum, tungsten, chromium, cobalt or iron. Instead of or in conjunction with the metal compounds, non-metals or compounds thereof, for example carbon graphite, lustrous carbon or boron-fluorine compounds may also be employed.

For cracking or polymerization reactions such catalysts of the silica gel-alumina gel type have proved particularly valuable for use in the present process as contain from 1 to 5 per cent, preferably from 2 to 4 per cent, of $Al_2O_3$ with reference to the sum of $SiO_2$ and $Al_2O_3$.

The process may be adapted both for fine-pored gels and for large-pored gels.

The dependency of the yield of gasoline in the cracking of Diesel oils (boiling point range from 200° to 370° C.) on the pH-value is apparent from the table below.

for use according to the present invention are denoted 1a, 1b, 2a, 2b, 4a and 8a. Whereas the large-pored gel 2b, which after cooling to 20° C. had a pH-value of 5.9, gave a yield of gasoline of only 1.1 per cent, this yield could be raised to 10.3 per cent by treating it with acid and distilled water and drying, thus stepwise reducing its pH-value to 3.0 (see No. 2). In the case of a large-pored gel (No. 8a) containing alumina, the yield was even increased from 9.0 to 19.3 per cent by reducing the pH-value from 5.9 to 3.6 (No. 8). On the other hand, in the case of a fine-pored silica gel (No. 1), when the pH-value was raised from 3.1 to 5.7 (No. 1a) by washing with alkaline liquids, the yield fell from 28.7 to 7.2 per cent; by washing the gel for example with sulphuric acid until a pH-value in the dry gel of 1.4 had been set up (No. 1b), the yield was reduced from 28.7 per cent to zero and in the case of a fine-pored silica gel containing alumina (No. 4), the pH-value of which had been raised from 3.4 to 5.2 (No. 4a), the yield was decreased from 41.6 to 16.8 per cent.

It will be seen that while the best large-pored gels of proper pH-value do not as a rule give yields of gasoline as high as the best fine-pored gels do, fine-pored gels of improper pH-value may considerably fall back in yield as compared with large-pored gels of proper pH-value. The latter, however, are well suitable for cracking hydrocarbons which readily undergo cracking, for example triisobutylene with the formation of isobutylene.

| 1 | 2 | 3 | 4 | 5 | 6 | 7 | 8 | 9 |
|---|---|---|---|---|---|---|---|---|
|   |   | Composition | | Benzene adsorption | pH | | | Yield of gasoline in per cent by weight |
| No. | Type of catalyst | $SiO_2$ | $Al_2O_3$ |  | Of the sol | Of the washed jelly | Of the final catalyst |  |
|   |   | Per cent | Per cent | Per cent |   |   |   |   |
| 1 | Fine-pored silica gel | 100 |  | 15 | 3.6 | 4 | 3.1 | 28.7 |
| 1a | do | 100 |  | 12 | 3.6 | 4 | 5.7 | 7.2 |
| 1b | Fine-pored silica gel (treated with acid) | 100 |  | 1.4 | 3.6 | 4 | 1.4 | 0.0 |
| 2 | Large-pored silica gel | 100 |  | 4 | 3.6 | 8-9 | 3.0 | 10.3 |
| 2a | do | 100 |  | 3 | 3.6 | 8-9 | 5.7 | 2.3 |
| 2b | do | 100 |  | 3 | 3.6 | 8-9 | 5.9 | 1.1 |
| 3 | Fine-pored silica—alumina gel | 99 | 1 | 15.0 | 3.5 | 2.0 | 3.4 | 34.0 |
| 4 | do | 97 | 3 | 15 | 2.8 | 4.8 | 3.4 | 41.6 |
| 4a | do | 97 | 3 | 13 | 2.8 | 4.8 | 5.2 | 16.8 |
| 5 | do | 95 | 5 | 14.2 | 3.0 | 4.2 | 3.6 | 35.0 |
| 6 | do | 90 | 10 | 14.2 | 2.8 | 4.1 | 3.6 | 30.0 |
| 7 | do | 80 | 20 | 13.6 | 2.5 | 3.9 | 4.0 | 27.0 |
| 8 | Large-pored silica-alumina gel | 97 | 3 | 4 | 2.8 | 10 | 3.6 | 19.3 |
| 8a | do | 97 | 3 | 4 | 2.8 | 10 | 5.9 | 9.0 |

As a measure of the porosity column 5 of the table sets forth in grams the amount of benzene adsorbed by 100 cubic centimeters of gel (pouring volume) at 18° C. from a hydrogen current saturated to the extent of 10 per cent with benzene vapor at this temperature. The gels free of alumina and those containing alumina were prepared in the usual manner by allowing to solidify a slightly acid, homogeneous, clear silica sol, the pH of which is indicated in column 6, and which in the cases indicated contained an aluminum salt. The jellies containing hydrochloric acid were then freed as far as possible from alkali metal salts by washing, brought to the desired pH-value, being of the order of 4 or 4.8 for the preparation of fine-pored gels (see German Patent No. 574,721) or of the order of 8 to 9 or 10 for the preparation of large-pored gels (see German Patents Nos. 444,914 and 527,370), then dried and heated to 450° C. The gels to be used in the process according to the present invention are denoted by simple numerals 1 to 8, whereas the gels which are not contemplated The table further shows that the gels containing alumina are superior to gels free of alumina of the same pH and porosity. The best results, as already mentioned, are obtained if the alumina content in the said gels amounts to from 1 to 5 per cent, especially to from 2 to 4 per cent. This fact may be seen from Experiments 1, 3, 5, 6 and 7 in which yields of gasoline are listed in dependency on the percentage of alumina in catalysts of fine-pored silica gel of approximately the same pH-value and the same size of pores.

The process according to the present invention is of particular importance because of its permitting to utilize inexpensive waste materials containing silica, for example the so-called "Si-Stoffe" which are obtained by the acid decomposition of minerals and earths, such as bauxite, nepheline, feldspars, leucite, alunite, slags, and especially kaolin and clay, preferably with acids, such as sulphuric acid, hydrochloric acid, nitric acid or sulphurous acid, for the production of alumina or titanium compounds, and which all contain a higher or lower percentage of alumina or titanium and, in addition, mostly iron.

As another inexpensive silica waste suitable for use we may mention the one obtained in the manufacture of superphosphate by leading gases containing silicon fluoride into water, and the one obtained in converting fluor spar rich in gangue into fluorine compounds, for example cryolite by converting fluosilicic acid intermediarily obtained into ammonium fluoride by means of ammonia; especially when preparing the silicic acid from an acid medium, i. e., when practicing the neutralization of the fluosilicic acid in two stages and using the weakly acid silicic acid obtained in the first stage after thorough washing. The residues containing silicic acid and alumina obtained by decomposing bauxite or clay with phosgene or a mixture of chlorine and carbon monoxide to form anhydrous aluminum chloride, as well as brown coal flue ashes are also suitable for making catalysts for reactions with carbonaceous materials, as they mostly only need being adjusted to a pH-value of between 3 and 4, moulded, if desired, and sometimes thoroughly washed with acids, alkalies or ammonia. The said waste materials may sometimes be improved by charging them with metal salts, metal hydroxides and oxides, for example alumina and/or metal sulphides.

What we claim is:

1. The process for the production of hydrocarbons by the thermal treatment of carbonaceous materials of a higher molecular weight at temperatures of more than 200° C., which comprises employing a catalyst obtained by adjusting the pH value of a porous material in such a manner that said porous material has a pH value between 3 and 4 after having been heated to temperatures of 200 to 800° C.

2. The process for the production of hydrocarbons by the thermal treatment of carbonaceous materials of a higher molecular weight at temperatures of more than 200° C., which comprises employing a catalyst obtained by treating a porous material which has, after heating to temperatures of 200 to 800° C., a pH value above 4 with acid in such a manner that said porous material has a pH value between 3 and 4 after having been heated to temperatures of 200 to 800° C.

3. The process of cracking hydrocarbon oil, which comprises employing a catalyst obtained by adjusting the pH value of a porous material in such a manner that said porous material has a pH value between 3 and 4 after having been heated to temperatures of 200 to 800° C.

4. The process for the production of hydrocarbons by the thermal treatment of carbonaceous materials of a higher molecular weight at temperatures of more than 200° C., which comprises employing a catalyst obtained by adjusting the pH value of a fine-pored material in such a manner that said fine-pored material has a pH value between 3 and 4 after having been heated to temperatures of 200 to 800° C.

5. The process for the production of hydrocarbons by the thermal treatment of carbonaceous materials of a higher molecular weight at temperatures of more than 200° C., which comprises employing a catalyst obtained by adjusting the pH value of a porous silicate in such a manner that said porous silicate has a pH value between 3 and 4 after having been heated to temperatures of 200 to 800° C.

6. The process for the production of hydrocarbons by the thermal treatment of carbonaceous materials of a higher molecular weight at temperatures of more than 200° C., which comprises employing a catalyst obtained by adjusting the pH value of a porous silicic mass in such a manner that said porous silicic mass has a pH value between 3 and 4 after having been heated to temperatures of 200 to 800° C.

7. The process for the production of hydrocarbons by the thermal treatment of carbonaceous materials of a higher molecular weight at temperatures of more than 200° C., which comprises employing a catalyst obtained by adjusting the pH value of a porous material containing silicic acid and at least one metal compound in such a manner that said porous material has a pH value between 3 and 4 after having been heated to temperatures of 200 to 800° C.

8. The process for the production of hydrocarbons by the thermal treatment of carbonaceous materials of a higher molecular weight at temperatures of more than 200° C., which comprises employing a catalyst obtained by adjusting the pH value of a porous mass comprising silicic acid and alumina in such a manner, that said porous mass has a pH value between 3 and 84 after having been heated to temperatures of 200 to 800° C.

9. The process for the catalytic destructive hydrogenation of carbonaceous materials under the conventional conditions for the production of hydrocarbon oils, which comprises employing a catalyst obtained by adjusting the pH value of a porous mass containing silicic acid and at least one metal compound in such a manner that said porous mass has a pH value between 3 and 4 after having been heated to temperatures of 200 to 800° C.

FRITZ STOEWENER.
FRIEDRICH BECKE.